July 29, 1958 — G. A. OLIVER ET AL — 2,844,890
MATHEMATICS TEACHING AID
Filed Dec. 20, 1954 — 2 Sheets-Sheet 1

GERALD A. OLIVER,
WILLIAM G. WEATHERS,
INVENTORS.

By William P. Green
ATTORNEY.

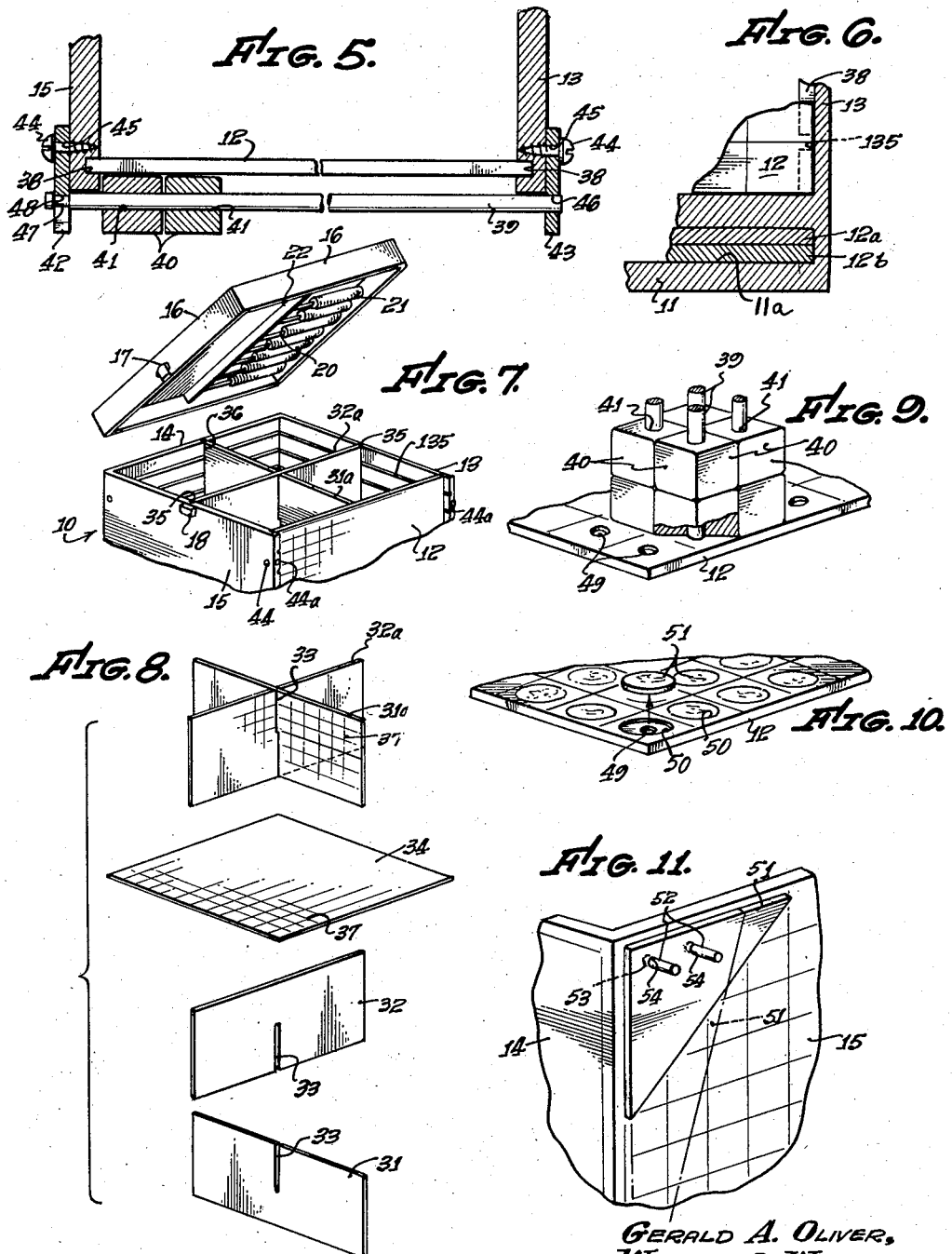

:::::::::::::::::::::::::::::::::::::::::::::::::::::::::::::::::::::::::

United States Patent Office 2,844,890
Patented July 29, 1958

2,844,890
MATHEMATICS TEACHING AID

Gerald A. Oliver, Fullerton, and William G. Weathers, Hawthorne, Calif.

Application December 20, 1954, Serial No. 476,253

11 Claims. (Cl. 35—31)

This invention relates to improved apparatus for facilitating the teaching of mathematics in schools.

In teaching children the concepts of addition, subtraction, multiplication, division, areas, volumes, fractional parts, etc., it is extremely helpful to the child if these ideas can be portrayed by some tangible apparatus or device, rather than merely relying on the intangible or abstract representations offered by the numbering system. The general object of the present invention is to provide an improved type of device for thus visually conveying the mathematical concepts to a pupil. Preferably, a single relatively compact unit is capable of representing all of the above concepts in a manner showing the relation between addition, subtraction, multiplication, and division, of both integers and fractions, and also showing the relation between a single dimension, an area, and a volume.

One feature of the invention resides in the provision of a unique device including a wall having a row of unit distance markings formed therealong, and a plurality of blocks or movable elements mounted adjacent those markings for movement to any of various different positions therealong. These blocks may be moved successively to different progressively advanced positions along the row of markings, to determine how many times the particular number of blocks (say two blocks), will go into the total number of units represented by the markings (say twelve). Thus, a simple problem in division is solved. Similarly, the blocks may be manipulated to solve simple addition, subtraction, and multiplication problems, all in a very easily understood manner, and in a manner showing clearly the relationships between the various concepts. Preferably, the wall is divided into a number of such rows of markings, typically forming together a representation of an area divided into several rows of squares or smaller areas, with several different groups of movable blocks or elements being associated respectively with the different rows of squares. The groups of blocks may be movably mounted by a number of rods extending in parallel spaced relation along the rows of markings.

To demonstrate the concept of volume, we find it desirable to employ a hollow box, and a number of partitions capable of subdividing the interior of the box into predetermined partial volumes. Preferably, the box has a side wall which is openable or removable to a condition allowing free viewing of the partitioned interior of the box by a student. The previously mentioned wall which coacts with the movable blocks may be a side wall of this same box, and is preferably the same wall that is removable for viewing of the box interior. The blocks may be removably mounted at the outer side of the wall.

An additional feature of the invention has to do with apparatus comprising a base member carrying a plurality of parallel pins or rods, about which may be positioned a number of individual stacks of blocks. These different stacks of blocks are thus usable to build up any of different composite volumes on the base member. The base member may be the removable wall of the previously described box, and the rods and blocks may be the same ones utilized at the outer side of that wall for teaching addition, subtraction, etc.

As still another feature, a wall, typically the removable wall of the box, may have area markings thereon, and may carry connector means adapted to mount any of different geometrical figures over the area markings for calculation of the areas of the different figures. To thus mount the geometrical figures, these figures may each have an opening or openings adapted to receive support pins projecting from the associated wall.

The above and other features and objects of the present invention will be better understood from the following detailed description of the typical embodiment illustrated in the accompanying drawings, in which.

Figure 3:
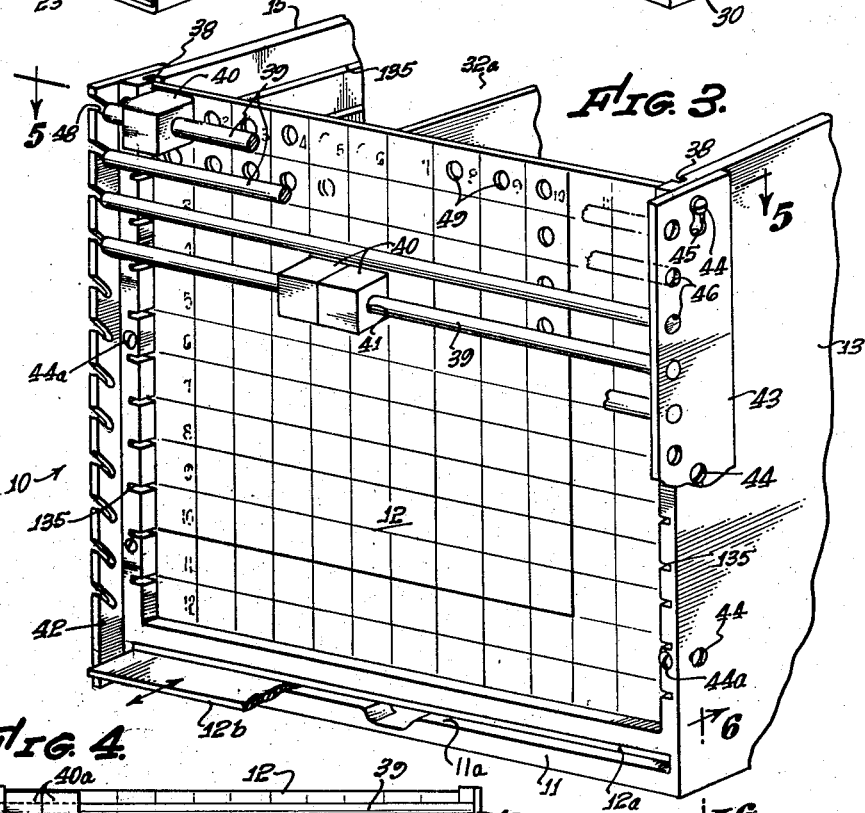
Fig. 3 is a fragmentary perspective view taken essentially from the same side as Fig. 1, but showing the cover of the device removed and showing some of the rods and blocks attached to the outside of the box.

Figs. 5 and 6 are fragmentary sectional views taken on lines 5—5 and 6—6 respectively of Fig. 3.

Fig. 7 is a fragmentary view of the upper portion of the box, showing the cover partially removed from the box;

Fig. 8 is an exploded perspective view showing the partitions for dividing up the interior of the box;

Figs. 9 and 10 are fragmentary perspective views representing two different uses of the removable side wall of the box; and Fig. 11 is a fragmentary perspective view of a corner portion of the box, showing the manner in which a comparison may be made between the area of one side wall of the box and any of various elements representing different geometrical shapes.

Figure 1:
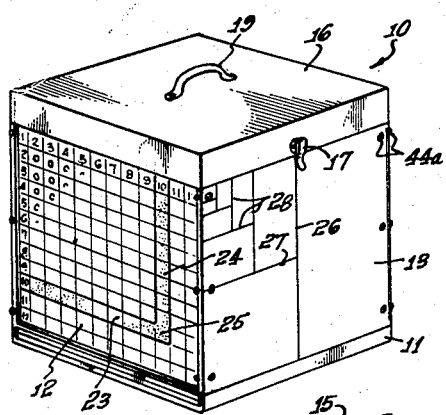
Fig. 1 is a perspective view of the outside of a teaching aid constructed in accordance with the invention, the view being taken from a point opposite one of the four corners of the device.
Figure 2:
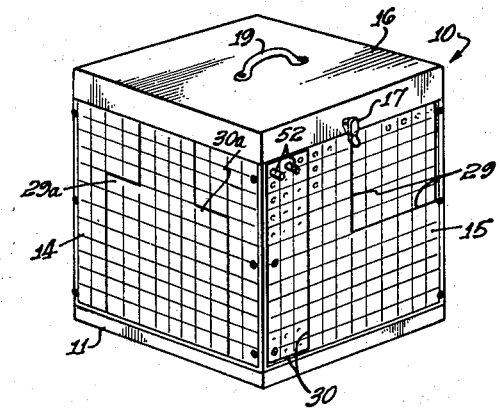
Figure 2 is a view corresponding to Fig. 1 but taken from an opposite corner or side of the device.

Referring first to Figs. 1 and 2, we have there shown at 10 a unit or kit which is adapted to be used as an aid in the teaching of mathematics. This kit includes a box 10, taking the form of a cube, and having a square bottom wall 11, and four vertically extending mutually perpendicular square side walls 12, 13, 14 and 15. These bottom and side walls define internally a cubical space, whose three equal dimensions may all be exactly twelve inches, so that the interior of the box is exactly one cubic foot. As will appear later, one of the vertical side walls 12 may be removable from the box, to allow viewing of the interior of the box by a student. The top of the box is closed by a removable top cover 16, which is of square configuration corresponding to the bottom wall, and which has a pair of latch elements 17 releasably engageable with coacting latch elements 18 at two opposite sides of the box to releasably retain the cover 16 on the box. A handle 19 may be provided on cover 16, for carrying the box when the cover is attached thereto, and for removing the cover from the box when latch elements 17 and 18 are released. As seen in Fig. 7, cover 16 preferably is of substantial thickness, and forms a square recess extending upwardly into the cover, within which are mounted a number of parallel rods 20, groups of beads 21 movably mounted on the rods, and a crossbar 22, forming an abacus within the cover. The beads of this abacus may be manipulated in a conventional manner along rods 20, and toward and away from bar 22 in teaching addition, subtraction, etc.

The four vertical sides 12, 13, 14 and 15 of box 10 of course are of identical areas, by virtue of the cubical construction of the box. As a further aid in teaching, some or all of these sides carry markings which break up or subdivide these equal areas in several different ways. For instance, wall 12 may have its one square foot area divided by vertical and parallel lines into 144 square inches, as shown, with the numbers 1 to 12 appearing horizontally in the upper horizontal row of squares, and the numbers 1 to 12 also appearing vertically in the left hand vertical row of squares. Colored lines 23 and 24 may be marked on wall 12, from the numbers 10 to a point of intersection 25, to outline on wall 12 an area representing exactly one hundred square inches.

Wall 13 may be marked differently and in a manner breaking up its one square foot area into a number of smaller areas of different sizes. For instance, a central vertical line 26 may be provided for dividing the area of side 13 into two equal halves, and a second line 27 may be provided for breaking up one of the halves into two-quarters. Similarly, additional lines 28 may further break up one of the quarters into other and smaller subdivisions of the one square foot area. Wall 15 may be marked off in 144 square inches in a manner similar to wall 12, but with additional heavier lines 29 marking off a first area representing one quarter of a square foot, and additional heavier lines 30 marking off an area shaped differently than that defined by lines 29 but of an equal area. The final side 14 of the box may have markings on it similar to those of side 15, but with the lines 29a and 30a delineating areas shaped differently than the corresponding lines 29 and 30 of side 15.

Internally, the one cubic foot volume of box 10 may be divided into smaller partial volumes by means of a number of partitions such as those seen in Fig. 8. These partitions typically include a pair of intersecting rectangular lower partitions 31 and 32, having slots 33 which allow interengagement of the two partitions 31 and 32 to subdivide the lower half of the one cubic foot box volume into four equal cubical spaces. Disposed across the upper sides of the partitions 31 and 32 there may be a horizontal partition 34 of one square foot area, above which are provided a second pair of partitions 31a and 32a (identical with lower partitions 31 and 32) for dividing the upper half of the box into four equal volumes. Partitions 32 and 32a are properly positioned within the box by sliding reception of their opposite vertical edge portions within a pair of grooves 35 extending vertically along the centers of the inner sides of walls 13 and 15. Similarly, one edge of each of the partitions 31 and 31a is slidably receibale within a vertical groove 36 formed in wall 14. It will of course be understood that partitions 31, 32, 31a and 32a, as well as partition 34, may all be withdrawn upwardly from box 10 as permitted by the sliding reception of the vertical partition edges within grooves 35 and 36. Preferably, the surfaces of all of these partitions are divided by markings 37 into square inches or other unit areas, to aid in the visualization of the relationship between the surface areas and the volumes within the various box compartments.

As previously mentioned, the wall 12 of box 10 is preferably adapted for removal from the box. When this wall is thus removed, the partitioned interior of the box is readily visible from the exterior of the box and through its open side wall, to allow visual comparison of the relationship between a volume of one cubic foot, and the smaller subdivisions of that volume. Preferably, wall 12 is mounted for its removal by sliding reception of the opposite side edges of wall 12 within a pair of vertically extending grooves 38 formed in the opposed edge portions of walls 13 and 15. To remove wall 12, it is necessary merely to slide that wall upwardly from its Fig. 3 position, as permitted by grooves 38, and until wall 12 is entirely free of interengagement with the grooves. The kit may be designed to include addiitonal removable walls 12a and 12b, dimensioned in correspondence with wall 12 and adapted to be substituted for wall 12 within grooves 38 when desired. These substitute walls 12a and 12b may carry different markings than walls 12. For instance walls 12a and 12b may have markings similar to those represented on walls 13 and 15, or any other type of markings, for use in teaching any of various different aspects of mathematics. It will of course be understood that both sides of each of the walls 12, 12a, and 12b may have such markings, to increase the usefulness of the device. As seen clearly in Figs. 3 and 6, the walls 12a and 12b, when not in use, may be removably slid into and stored within a recess 11a formed in the bottom wall 11 of the box.

Figure 4:
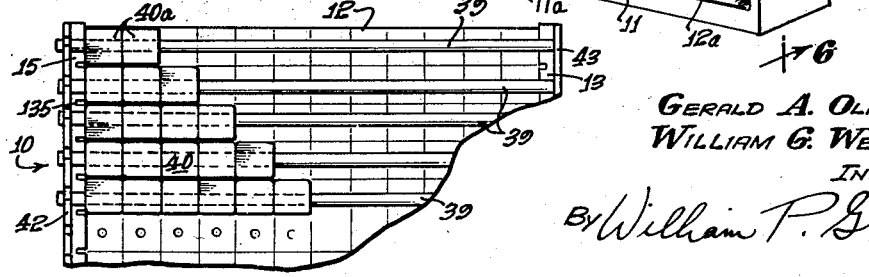
Fig. 4 is a fragmentary view looking directly toward the side of the box which is shown in Fig. 3.

For use in association with wall 12, we provide a number of rods or elongated cylindrical pins 39 which are adapted to movably mount several groups of blocks 40 at the outer side of wall 12. Rods 39 are mounted in vertically spaced relation, with the axes of adjacent rods spaced vertically one inch apart, and with each of the rods extending parallel to and opposite the vertically central portions of one of the horizontal rows of square unit area markings on wall 12. The blocks 40 may be cube shaped, each forming substantially one cubic inch. Each of the blocks 40 has a central passage or aperture 41 extending therethrough, of a diameter slightly greater than the external diameter of rod 39, so that the blocks may be carried about rods 39 for horizontal sliding movement therealong. As seen in Fig. 4, the different rods 39 preferably have different numbers of blocks mounted thereon, some of the rods typically carrying 2, 3, 4, 5 and 6 blocks. The blocks are adapted to be brought directly opposite the different one square inch markings on wall 12, as is also indicated in Fig. 4. The spacing of rods 39 from wall 12 may be such that the rear sides of blocks 40 slidably engage the flat surface of wall 12.

In using the blocks and rods of Figs. 3 and 4, a particular group of the blocks (say the group of two designated at 40a in Fig. 4) may be successively moved to different positions along the associated rod 39, to solve a desired mathematical problem. For instance, these two blocks may first be placed in their Fig. 4 positions opposite the two squares which are nearest the left side of wall 12. Next, those two blocks may be slid to the right to a position opposite squares 3 and 4, and then further to positions opposite squares 5 and 6, etc., until the two blocks 40a have been moved entirely across the face of wall 12. The user may count the number of steps required as the two blocks are progressively moved through distances representing two inches each, to thus determine how many times the number two will go into the number twelve. In this manner a problem of division may be solved. It will of course be apparent that similar movements of blocks 40a will serve to represent problems in addition, subtraction and multiplication. Also, the other groups of blocks having different numbers of blocks, may be utilized to solve corresponding problems in which different numbers are involved.

Rods 39 are desirably mounted removably to the outside of box 10, by means of a pair of vertically extending mounting elements 42 and 43, which are attachable to edge portions of walls 13 and 14 respectively. For attaching elements 42 and 43 to these walls, the latter may be provided with two or more vertically spaced laterally projecting screws or headed retaining members 44, which are removably receivable within keyhole shaped slots 45 in elements 42 and 43 to form detachable connections between the walls and elements 42 and 43. Slots 45 have lower portions of sufficiently large dimension to pass the heads of screws 44, so that elements 42 and 43 may be slipped into positions against walls 13 and 15 when screws 44 are directly opposite the enlarged portions of slots 45. After being thus positioned, elements 42 and 43 may be slipped downwardly so that the upper reduced width portions of slots 45 embrace the reduced dimension shank portion of headed screws 44 so that the heads of the screws prevent accidental removal of elements 42 and 43.

Element 43 has a number of vertically spaced apertures 46 which are adapted to removably receive and position first ends of rods 39. Toward their opposite ends, the rods have reduced diameter portions 47, which are adapted to be slipped angularly downwardly into angular retaining slots or recesses 48 in element 42, to mount rods 39 to the outside of the box.

The removable wall 12 of the box, when in its detached position, may be utilized as a base for building up representations of different volumes on the surface of that wall. This use of wall 12 is represented in Fig. 9. As seen in that figure, there is preferably provided at the center of each of the one square inch unit areas marked off on wall 12, a circular opening 49, of a diameter to receive and hold an end portion of one of the rods 39. With the wall 12 in horizontal condition, the rods 39, or another group of similar rods, are connected into openings 49 to project upwardly in spaced parallel relation from wall 12. Blocks 40 may then be slipped onto rods 39, to form a number of stacks of blocks on wall 12, and the blocks thus retained in position on wall 12 may be arranged to form any of a number of different composite volumes on the upper surface of wall 12.

Fig. 10 shows wall 12 in a horizontally extending condition, but inverted from the position of Fig. 9. As seen in Fig. 10, wall 12 preferably has, at the side of wall 12 which faces inwardly of the box in Fig. 1, a number of circular recesses 50 formed within the individual square inch area markings, and desirably concentric with the corresponding apertures 49. Recesses 50 may be dimensioned to exactly receive individual coins 51, say for instance pennies, so that a large number of pennies may be positioned on the surface of wall 12 and then individually withdrawn or added to indicate problems of subtraction and addition. We have found it very helpful if 100 of these recesses 50 are provided on wall 12, to receive 100 pennies, so that removal of a particular number of the pennies will represent percentages.

Referring now to Fig. 11, an additional feature of the invention involves the provision of several different planar elements 51, representing differently shaped geometrical features, such as triangles, rectangles, squares, or other straight sided polygons. These elements representing different geometrical figures are adapted to be removably and separately connected to the outside of the wall 15 of the box, over the area markings on that wall, so that the area of a triangle or other part can be determined by referring to the square inch markings on the wall. For thus attaching the elements 51 to wall 15, we may provide a pair of dowel pins 52, which are connectible into openings 53 in wall 15, with mating openings 54 being provided on the different elements 51, so that elements 51 may be slipped onto and thereby supported by pins 52 attached to wall 15. Preferably, the extremities of elements 51 coincide exactly with certain of the one inch markings on wall 15, to facilitate the comparison between the areas of the elements and the area markings on the wall. Also, if the triangular or other element 51 has a corner portion, that corner is preferably positioned opposite a corner of wall 15. It is further contemplated that dowel 52 should be dimensioned for mounting within two of the openings 49 of wall 12 if desired, so that the dowels and elements 51 may be mounted to wall 12 instead of wall 15.

At the inner sides of walls 13, 14 and 15, there may be formed in these walls a number of vertically spaced horizontal grooves 135 into which the removable wall 12 is horizontally slidable to a position in which it extends horizontally across the interior of the box. These grooves 135 are provided at locations spaced one inch apart throughout the entire height of the box, so that wall 12 may be positioned within the box at any of these vertically spaced locations, to divide off $1/12$, $2/12$, $3/12$, etc., of the box volume, if desired. To allow such insertion of wall 12 horizontally into any of the various grooves 135, the interior partitions 31, 32, 34, 31a and 32a must of course be removed from the box.

It is desirable that the apparatus be so designed that pins 39 and blocks 40 can be mounted at any of the four sides of the box. Consequently, there may be provided, in addition to the screws 44, a number of screws 44a at locations to removably mount elements 43 to any of the various vertically extending edge portions of the side walls, so that the pins 39 extending between elements 43 may be received opposite permanent walls 13, 14 and 15, as well as the removable wall 12.

We claim:

1. A mathematics teaching aid comprising a wall, markings on said wall marking off a predetermined area in unit squares forming a plurality of rows of said squares, a plurality of groups of blocks positioned along different ones of said rows of squares, different ones of said groups comprising different numbers of blocks less than the number of squares in said rows, and means mounting said blocks for movement along said rows of markings to different positions therealong opposite different groups of said squares.

2. A mathematics teaching aid as recited in claim 1, in which said blocks are essentially square and of dimensions corresponding to said square markings on the wall, said mounting means comprising a plurality of essentially parallel rods extending along said rows of squares respectively and about which said different groups of blocks are slidably mounted for movement therealong.

3. A mathematics teaching aid as recited in claim 2, including a box having said wall as one of its sides, said mounting means including means for removably mounting said rods in substantially parallel positions at the outside of said box adjacent said square markings.

4. A mathematics teaching aid as recited in claim 3, in which said last mentioned means include two mounting members detachably connectable to a pair of opposite sides of the box and having essentially corresponding apertures for removably receiving and mounting opposite ends of said rods.

5. A mathematics teaching aid comprising a hollow box of cubical configuration, removable partitions positionable in said box to divide the interior of the box into a plurality of compartments, said removable partitions including a first partition dividing the interior of said cubical box into two equally dimensioned half cubical compartments, and additional partitions subdividing one of said half cubical compartments and forming therein a plurality of smaller compartments which are cubical in shape and equal to one eighth of the entire box volume, said box having a vertically extending wall closing one side of said box and movable to an open position allowing viewing of the partitioned interior of the box through said side thereof, and means for mounting said wall to said box in a position closing said side thereof.

6. A mathematics teaching aid as recited in claim 5, in which there are a plurality of auxiliary walls having different area markings thereon and all removably connectable to said side of the box, said teaching aid including means for mounting said walls to the bottom of said box when not in use.

7. A mathematics teaching aid as recited in claim 5, in which said wall is adapted to be removed from said box and to be placed in essentially horizontal position, a plurality of pins adapted to be connected to said wall and to project upwardly therefrom in parallel laterally spaced relation, and a plurality of blocks each having an aperture for receiving one of said pins and adapted to be received about the pins in a plurality of stacks forming a substantially solid composite volume on the wall.

8. A mathematics teaching aid comprising a hollow box having a plurality of upwardly extending side walls, a row of markings on an outer side of one of said side walls subdividing a predetermined distance into smaller unit distances, a plurality of elements positioned at the outside of the box adjacent said row of markings and occupying predetermined unit distances along said row of markings, and means for mounting said elements at the outside of the box for movement along said row of markings to different positions therealong.

9. A mathematics teaching aid as recited in claim 8, in which the markings on said one wall comprise markings subdividing a predetermined area into a plurality of rows of squares, there being a plurality of groups of said elements along said different rows of squares respectively and comprising blocks dimensioned in accordance with said squares, and said mounting means comprising a plurality of parallel rods carried at the outside of said one wall and mounting said groups of blocks for movement to different positions along said rows of square markings.

10. A mathematics teaching aid as recited in claim 9, in which said mounting means include a pair of vertically extending elements detachably connectible to a pair of opposite sides of the box and having essentially corresponding series of apertures for receiving opposite ends of and mounting said rods, there being means removably mounting said one wall to said box.

11. A mathematics teaching aid comprising a box having a side wall, a row of markings on said wall subdividing a predetermined distance into smaller unit distances, a plurality of blocks positioned adjacent said row of markings and having dimensions corresponding to and occupying predetermined unit distances along said row of markings, and means mounting said blocks for movement along said row of markings to different positions therealong to allow comparison of the dimensions of said blocks with the length of said row of markings, said mounting means comprising a rod extending alongside and longitudinally of said row of markings and carrying said blocks for sliding movement longitudinally therealong, and means for removably mounting said rod to the outer side of said wall adjacent said row of markings.

References Cited in the file of this patent
UNITED STATES PATENTS

| | | |
|---|---|---|
| 380,532 | Siefert | Apr. 3, 1888 |
| 419,393 | Wobus | Jan. 14, 1890 |
| 595,455 | Glidden | Dec. 14, 1897 |
| 1,329,850 | Pye | Feb. 3, 1920 |
| 1,475,112 | Grimes et al. | Nov. 20, 1923 |
| 1,594,376 | Passmore | Aug. 3, 1926 |
| 2,584,601 | Mauser | Feb. 5, 1952 |
| 2,611,193 | Davis | Sept. 23, 1952 |

FOREIGN PATENTS

| | | |
|---|---|---|
| 1,097,413 | France | Feb. 16, 1955 |
| 13,357 | France | Jan. 11, 1911 |
| | (2nd Ed. to #404,648) | |
| 16,204 | Netherlands | Aug. 15, 1927 |
| 50,185 | Netherlands | Apr. 15, 1941 |